United States Patent
Kim et al.

(10) Patent No.: US 9,344,000 B2
(45) Date of Patent: May 17, 2016

(54) POWER MODULE VARYING BIAS POWER AND DISTRIBUTED POWER SUPPLY APPARATUS

(71) Applicants: SAMSUNG ELECTRO-MECHANICS CO., LTD., Suwon, Gyunggi-do (KR); Korea Advanced Institute of Science and Technology, Daejeon (KR)

(72) Inventors: Chong Eun Kim, Gyunggi-do (KR); Jeong Nam Lee, Gyunggi-do (KR); Duk You Kim, Seoul (KR); Gun Woo Moon, Daejeon (KR); Don Sik Kim, Gyunggi-do (KR)

(73) Assignees: SAMSUNG ELECTRO-MECHANICS CO., LTD., Suwon, Gyunggi-Do (KR); KOREA ADVANCED INSTITUTE OF SCIENCE AND TECHNOLOGY, Yuseong-Gu, Daejeon (KR)

(*) Notice: Subject to any disclaimer, the term of this patent is extended or adjusted under 35 U.S.C. 154(b) by 353 days.

(21) Appl. No.: 13/840,033

(22) Filed: Mar. 15, 2013

(65) Prior Publication Data
US 2014/0177301 A1    Jun. 26, 2014

(30) Foreign Application Priority Data
Dec. 21, 2012   (KR) .................. 10-2012-0151305

(51) Int. Cl.
*H02J 1/10*    (2006.01)
*H02M 7/23*    (2006.01)
*H02M 7/515*   (2007.01)
*H02M 1/42*    (2007.01)
*H02M 3/337*   (2006.01)
*H02M 1/00*    (2006.01)

(52) U.S. Cl.
CPC ............. *H02M 7/23* (2013.01); *H02M 1/4225* (2013.01); *H02M 3/337* (2013.01); *H02M 2001/007* (2013.01); *H02M 2001/0032* (2013.01); *Y02B 70/126* (2013.01); *Y02B 70/16* (2013.01)

(58) Field of Classification Search
CPC ................................ H02M 7/23; H02M 3/337
USPC ......... 323/266; 363/65, 67–70, 81, 84, 86–92, 363/123–127
See application file for complete search history.

(56) References Cited

U.S. PATENT DOCUMENTS

2007/0138971 A1* 6/2007 Chen .................... 315/209 R
2009/0322257 A1* 12/2009 Kim et al. ............... 315/308
2010/0246225 A1  9/2010 Moon et al.

FOREIGN PATENT DOCUMENTS

JP    2010-154614 A    7/2010
JP    2010-186224 A    8/2010
KR    2010-0108902 A   10/2010

*Primary Examiner* — Adolf Berhane
*Assistant Examiner* — Nusrat Quddus
(74) *Attorney, Agent, or Firm* — McDermott Will & Emery LLP (57) ABSTRACT

There are provided a power module in which a bias voltage is varied and supplied to a control circuit controlling power conversion when an idle mode is switched to a normal mode, and a distributed power supply apparatus having the same. The power module includes: a power factor correction stage; a DC/DC conversion stage switching power to convert the power into pre-set DC power in a powering mode in which normal power is output; a standby stage converting the power into pre-set standby power in a cold standby mode in which the DC/DC conversion stage outputs power having a level lower than that of normal power; and a variable bias supply unit varying a voltage level of bias power for controlling DC/DC power conversion and supplying the same to the DC/DC conversion stage in the cold standby mode and the powering mode.

18 Claims, 7 Drawing Sheets

PRIOR ART

POWER MODULE VARYING BIAS POWER AND DISTRIBUTED POWER SUPPLY APPARATUS

CROSS-REFERENCE TO RELATED APPLICATIONS

This application claims the priority of Korean Patent Application No. 10-2012-0151305 filed on Dec. 21, 2012 in the Korean Intellectual Property Office, the disclosure of which is incorporated herein by reference.

BACKGROUND OF THE INVENTION

1. Field of the Invention

The present invention relates to a power module capable of reducing an inrush current generated when an idle mode is switched to a normal node, and a distributed power supply apparatus.

2. Description of the Related Art

In general, a variety of electronic devices that meet diverse consumer demands have been introduced, and electronic devices may employ a power supply apparatus supplying operating power to execute pertinent functions.

A power supply apparatus may employ a switched mode power supply (SMPS) due to advantages of power conversion efficiency, compactness, and the like.

Types of power supply apparatuses may include a distributed power supply apparatus having a plurality of power modules to supply high capacity power to an electronic device requiring high capacity power, such as a server.

Figure 1:
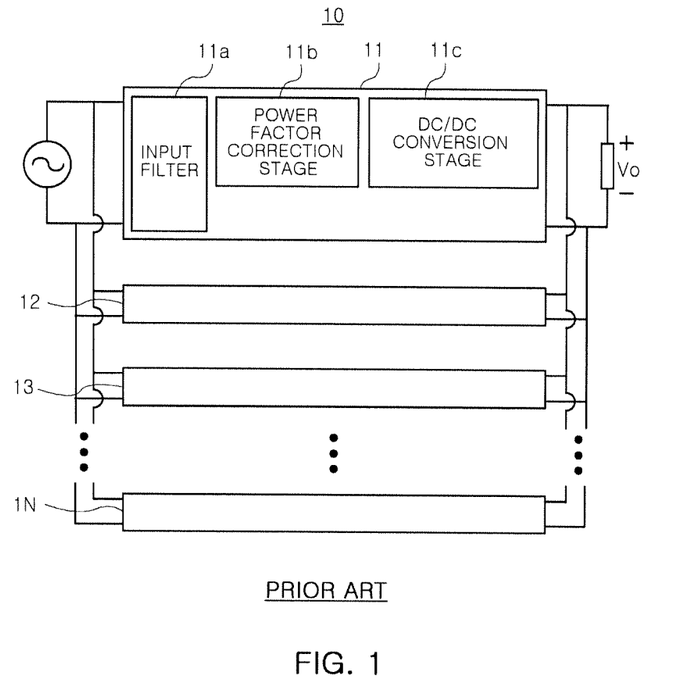
FIG. 1 is a schematic view illustrating a configuration of a general distributed power supply apparatus.

FIG. 1 is a view illustrating a general distributed power supply apparatus.

Referring to FIG. 1, a general distributed power supply apparatus 10 may include first to Nth power modules 11, 12, ..., 1N (N is a natural number of 1 or more) connected in parallel, and here, the first power module 11 may include an input filter 11a, a power factor correction stage 11b, and a DC/DC conversion stage 11c.

The distributed power supply apparatus may be broken down, and in this case, modules may be replaced. Here, a hot swap technique of removing only a failed power module and inserting a new power module, without having to cut the entire power supply, may be used due to ease of maintenance, repairs, and upgrades.

Meanwhile, the foregoing distributed power supply apparatus 10 combines outputs of the first to Nth power modules 11, 12, ..., 1N and transfers the same to a load, and here, as disclosed in the related art document, power modules continuously operate to increase power consumption, so in order to solve this problem, at least a portion of power modules are operated in an idle mode in the case of no-load or light-load and when loads are increased, the power modules may be operated in a normal mode. In this case, however, when the power modules are switched from the idle mode to the normal mode, an inrush current is generated to apply excessive voltage stress to an element used for power conversion.

RELATED ART DOCUMENT (Patent document 1) Korean Patent Laid-Open Publication No. 10-2010-0108902

SUMMARY OF THE INVENTION

An aspect of the present invention provides a power module in which a bias voltage is varied and supplied to a control circuit controlling power conversion when an idle mode is switched to a normal mode, and a distributed power supply apparatus having the same.

According to an aspect of the present invention, there is provided a power module including: a power factor correction stage switching input power to correct a power factor thereof; a DC/DC conversion stage switching power having a corrected power factor from the power factor correction stage to convert the power into pre-set DC power in a powering mode in which normal power is output; a standby stage converting the power having a corrected power factor from the power factor correction stage into pre-set standby power in a cold standby mode in which the DC/DC conversion stage outputs power having a level lower than that of normal power; and a variable bias supply unit varying a voltage level of bias power for controlling DC/DC power conversion and supplying the same to the DC/DC conversion stage in the cold standby mode and the powering mode.

The power factor correction stage may include: a power factor correction unit switching input power and regulating a phase difference between a voltage and a current of the input power to correct a power factor thereof; and a power factor correction controller controlling a switching operation of the power factor correction unit.

The DC/DC conversion stage may include: a DC/DC conversion unit switching power having a corrected power factor to convert it into DC power; and a DC conversion controller controlling a switching operation of the DC/DC conversion unit upon receiving bias power having a varied voltage level from the variable bias supply unit.

When the cold standby mode is switched to the powering mode, the DC/DC conversion unit may perform a power switching operation by following a pre-set reference voltage.

The DC conversion controller may include: a comparator comparing the reference voltage and a voltage detected from the output power upon receiving the bias power; and a signal generation unit generating a switching control signal for controlling power switching of the DC/DC conversion unit according to the comparison result from the comparator and a pre-set triangular wave signal.

The DC conversion controller may further include: a buffer buffering the comparison result from the comparator and delivering the same to the signal generation unit.

In the cold standby mode, the variable bias supply unit supplies pre-set first bias power to the comparator during a pre-set period of time, and in the powering mode, the variable bias supply unit supplies second bias power set to have a voltage level higher than that of the first bias power to the comparator during the pre-set period of time. The variable bias supply unit may supply pre-set first bias power to the comparator during a pre-set period of time, and in the powering mode, the variable bias supply unit may supply second bias power set to have a voltage level higher than that of the first bias power to the comparator during the pre-set period of time.

The variable bias supply unit may include: a regulator converting standby power from the standby stage into first and second bias power according to a pre-set resistance ratio; a divided resistor group having a plurality of divided resistors for setting the resistance ratio; and a switch changing the set resistance ratio of the divided resistor group in the powering mode.

The power module may further include: an input filter unit rectifying AC power and filtering electromagnetic interference and providing the same to the power factor correction stage.

According to another aspect of the present invention, there is provided a distributed power supply apparatus including: a plurality of power modules connected in parallel and supplying pre-set power, wherein each of the plurality of power modules includes: a power factor correction stage switching input power to correct a power factor thereof; a DC/DC conversion stage switching power having a corrected power factor from the power factor correction stage to convert the power into pre-set DC power in a powering mode in which normal power is output; a standby stage converting the power having a corrected power factor from the power factor correction stage into pre-set standby power in a cold standby mode in which the DC/DC conversion stage outputs power having a level lower than that of normal power; and a variable bias supply unit varying a voltage level of bias power for controlling DC/DC power conversion and supplying the same to the DC/DC conversion stage in the cold standby mode and the powering mode.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, embodiments will be described in detail with reference to the accompanying drawings such that they can be easily practiced by those skilled in the art to which the present invention pertains.

In describing the present invention, if a detailed explanation for a related known function or construction is considered to unnecessarily divert the gist of the present invention, such explanation will be omitted but would be understood by those skilled in the art.

Also, similar reference numerals are used for the similar parts throughout the specification.

It will be understood that when an element is referred to as being "connected to" another element, it can be directly connected to the other element or intervening elements may also be present. In contrast, when an element is referred to as being "directly connected to" another element, no intervening elements are present.

In addition, unless explicitly described to the contrary, the word "comprise" and variations such as "comprises" or "comprising," will be understood to imply the inclusion of stated elements but not the exclusion of any other elements.

Embodiments of the present invention will be described in detail with reference to the accompanying drawings.

Figure 2:
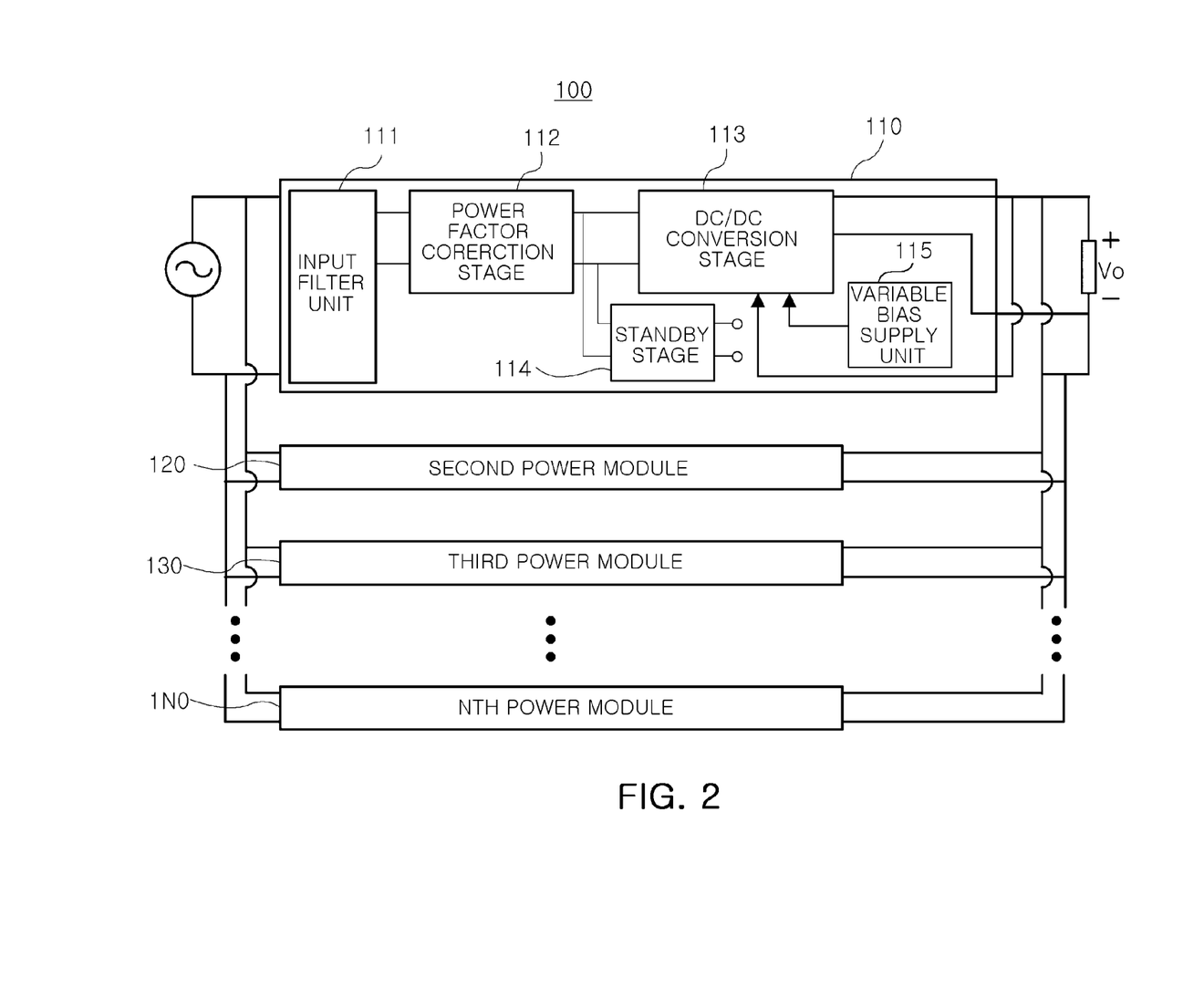
FIG. 2 is a schematic view illustrating a configuration of a distributed power supply apparatus according to an embodiment of the present invention.
Figure 3:
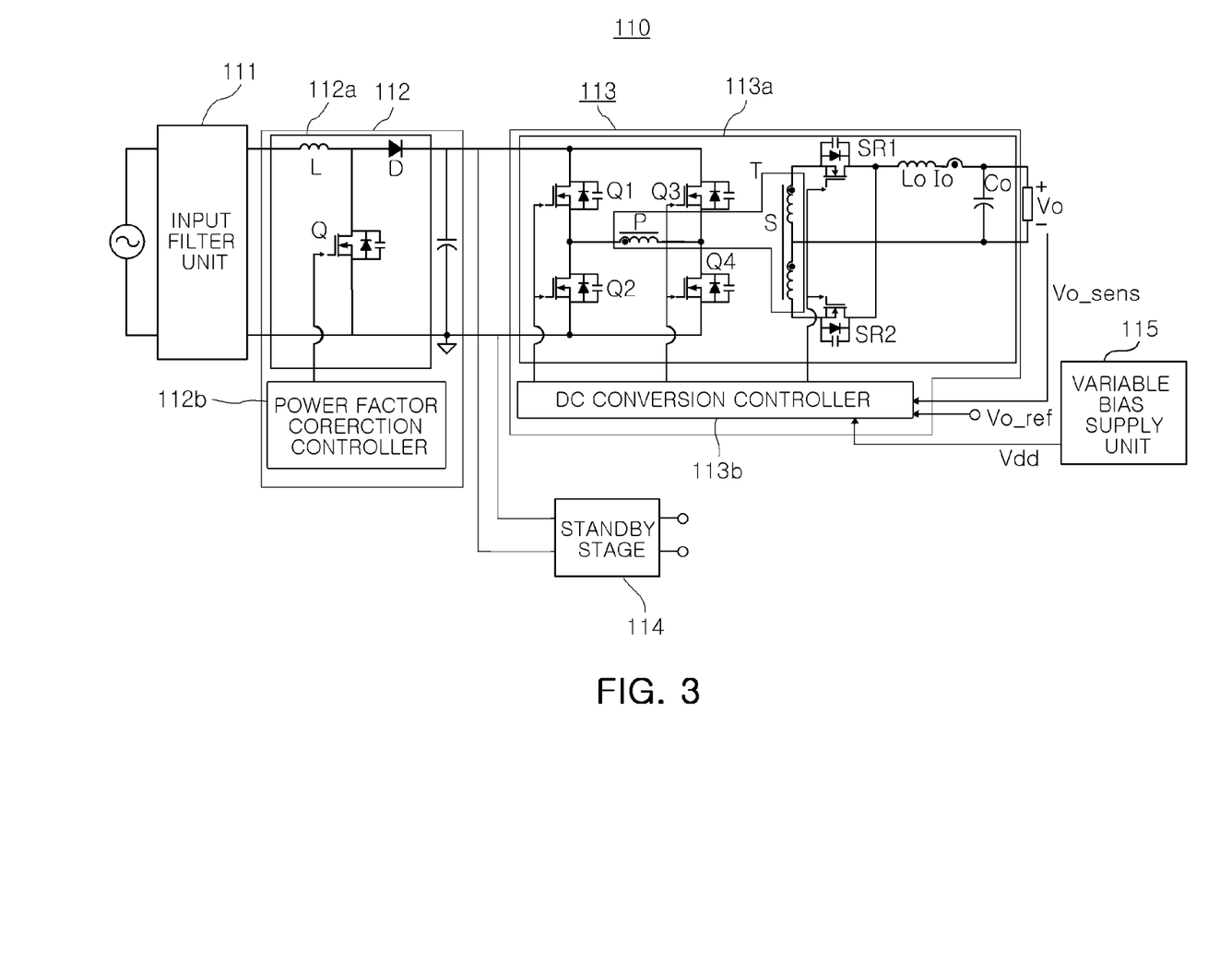
FIG. 3 is a schematic view illustrating a configuration of a power module employed in the distributed power supply apparatus illustrated in FIG. 2.

FIG. 2 is a schematic view illustrating a configuration of a distributed power supply apparatus according to an embodiment of the present invention. FIG. 3 is a schematic view illustrating a configuration of a power module employed in the distributed power supply apparatus illustrated in FIG. 2.

Referring to FIG. 2, a distributed power supply apparatus 100 according to an embodiment of the present invention may include a plurality of power modules 110, 120, 130, and 1N0.

The plurality of power modules 110, 120, 130, and 1N0 may output pre-set DC power, respectively, and the output DC powers may be grouped into single output power so as to be applied to a load.

The plurality of power modules 110, 120, 130, and 1N0 may have the same configuration. For example, as for a configuration of the first power module 110, the first power module 110 may include an input filter unit 111, a power factor correction stage 112, a DC/DC conversion stage 113, a standby stage 114, and a variable bias supply unit 115.

Referring to FIG. 3, the input filter unit 111 may rectify and smooth input AC power and supply rectified power to the power factor correction stage 112.

The power factor correction stage 112 may correct a phase difference between a voltage and a current of the rectified power from the input filter unit 111 to correct a power factor. To this end, the power factor correction stage 112 may include a power face correction unit 112a switching the rectified power from the input filter unit 111 to correct a power factor, and a power factor correction controller 112b controlling a switching operation of the power factor correction unit 112a. In order to correct a power factor, the power factor correction unit 112a may include a switch Q switching rectified power, an inductor L charging and discharging energy of switched power, and a diode D providing a transmission path of power having a corrected power factor.

The DC/DC conversion stage 113 may convert DC power having a corrected power factor into pre-set DC power and output the same. The DC/DC conversion unit 113a may include a switch group Q1 to Q4, a transformer T, and rectifying circuits SR1, SR2, Lo, and Co.

The switch groups Q1 to Q4 may be configured according to a half-bridge scheme or a push-pull scheme having at least two switches or a full-bridge scheme having four switches. For example, FIG. 3 illustrates a structure based on a full-bridge scheme having four switches Q1, Q2, Q3, and Q4 switching power having a corrected power factor.

The transformer T may have a primary winding P and a secondary winding S. The primary winding P may form a pre-set winding ratio with the secondary winding S. The primary winding P may receive power which has been switched by the switch group Q1 to Q4, and the secondary winding S may transform a voltage level of power input to the primary winding P according to the winding ratio. In addition, the secondary winding S may be divided to have a center tap.

The rectifying circuits SR1, SR2, Lo, and Co may include rectifying elements SR1 and SR2, an output inductor Lo, and an output capacitor Co.

The rectifying elements SR1 and SR2 may be synchronized with switching of the switch group Q1 to Q4 to rectify output power from the secondary winding S.

The output inductor Lo and the output capacitor Co filter rectified power from the rectifying elements SR1 and SR2 to stabilize the same, and output DC power.

The DC conversion controller 113b may control switching of the switch group Q1 to Q4, and to this end, the DC conversion controller 113b may receive feedback of a voltage level of the DC power.

Figure 4:
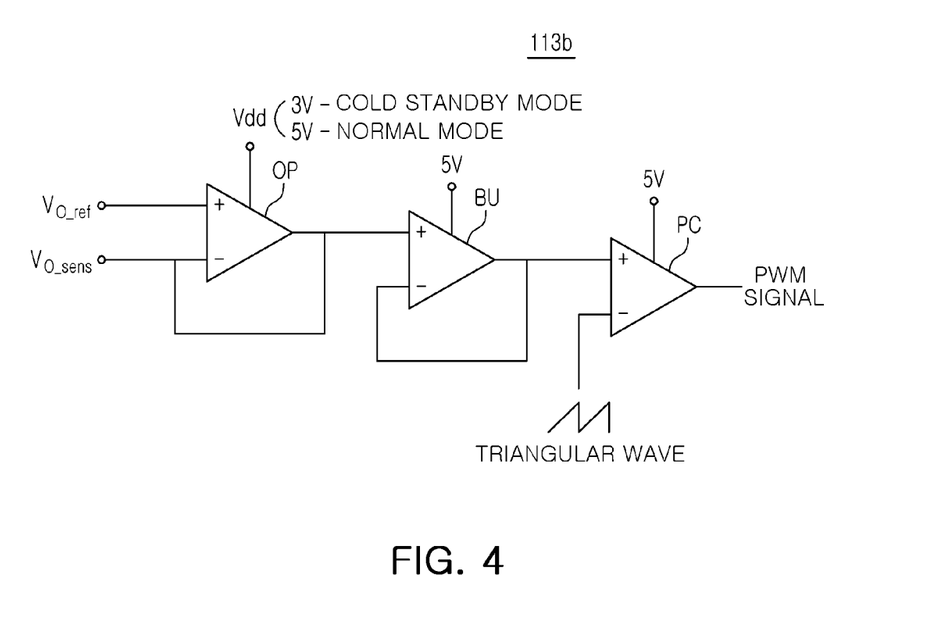
FIG. 4 is a schematic view illustrating a configuration of a DC conversion controller employed in the power module illustrated in FIG. 3.

FIG. 4 is a schematic view illustrating a configuration of the DC conversion controller 113b employed in the power module illustrated in FIG. 3.

Referring to FIG. 4, the DC conversion controller 113b may include a comparator OP and a signal generation unit PC. The DC conversion controller 113b may further include a buffer BU.

Upon receiving bias power Vdd from the variable bias supply unit 115, the comparator OP may compare a feedback signal Vo_sens and a pre-set reference voltage Vo_ref.

A comparison result from the comparator OP may be delivered to the signal generation unit PC. The signal generation unit PC may generate a switching control signal (PWM signal) for controlling power switching of the switch group Q1 to Q4 of the DC/DC conversion unit 113a.

Meanwhile, operations of the power factor correction stage 112 and the DC/DC conversion stage 113 may be different according to a load state. When the user turns off power, operations of the power factor correction stage 112 and the DC/DC conversion stage 113 may be stopped. In a powering mode, i.e., in a normal operating mode, such as hot swap or heavy loading, the operations of the power factor correction stage 112 and the DC/DC conversion stage 113 may be resumed. In a cold standby mode, such as a light load, only a minimum power supply operation of the DC/DC conversion stage 113 may be maintained.

The standby stage 114 may convert power having a corrected power factor from the power factor correction stage 112 into pre-set standby power and output the same, and in this case, the standby power may be supplied to the variable bias supply unit 115. The standby stage 114 may perform an operation contrary to that of the DC/DC conversion stage 113.

Namely, in the powering mode, the standby stage 114 may stop supply of the standby power, and in the cold standby mode, the standby stage 114 may supply the standby power.

The variable bias supply unit 115 may supply bias power to the DC conversion controller 113b of the DC/DC conversion stage 113 according to an operating mode of the power module 110.

Figure 5:
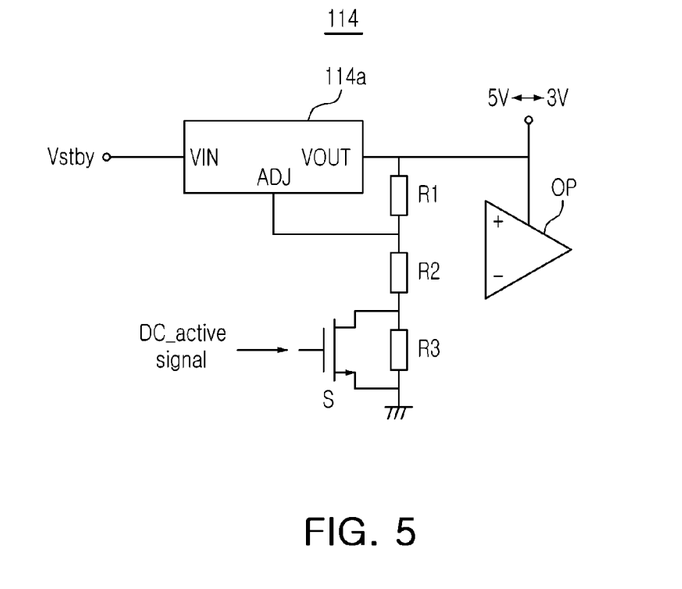
FIG. 5 is a schematic view illustrating a configuration of a variable bias supply unit employed in the power module illustrated in FIG. 3.

The variable bias supply unit 115 may include a regulator 115a, a divided resistor group (R1, R2, and R3), and a switch S.

The regulator 115a may receive standby power Vstby by an input terminal VIN thereof from the standby stage 114, vary a voltage according to a resistance ratio input to a regulation terminal ADJ thereof, and output bias power through an output terminal VOUT thereof. A voltage level of the bias power may be, for example, 3V or 5V. As described above, the bias power may be supplied to the comparator OP of the DC conversion controller 113b.

The divided resistor group R1 to R3 may include a plurality of divided resistors R1 to R3 for setting a resistance ratio, and the switch S may be switched on or switched off according to the presence or absence of a normal mode operation signal (DC active signal) to set the resistance ratio.

Accordingly, the regulator 115a may supply bias power of 3V in the cold standby mode and supply bias power of 5V in the powering mode.

Meanwhile, in a case in which a power conversion operation is stopped and subsequently resumed, the DC/DC conversion stage 113 may perform a soft start function such that an output voltage is slowly increased while a followed voltage is being gradually upwardly regulated. In this respect, when the DC/DC conversion stage 113 is in an idle mode (so it does not operate), in the powering mode in the case of a hot swap or when heavy loading is required, or the like, the DC/DC conversion stage 113 may not perform the soft start operation but a reference voltage may be allowed to be directly followed to immediately provide required DC power. Thus, when the cold standby mode providing power in case of a light load is switched to the powering mode in the case of a hot swap or heavy loading, an inrush current may be rapidly generated.

Thus, in the variable bias supply unit 115, since power having a level lower than that of normal power is required to be output in the cold standby mode, a voltage level of variable bias power is set to be low, e.g., 3V, while, in the powering mode, a voltage level is set to be high, e.g., 5V, unlike the cold standby mode, thus restraining an inrush current from being rapidly generated in the early stage of the power mode operation.

Figure 6A:
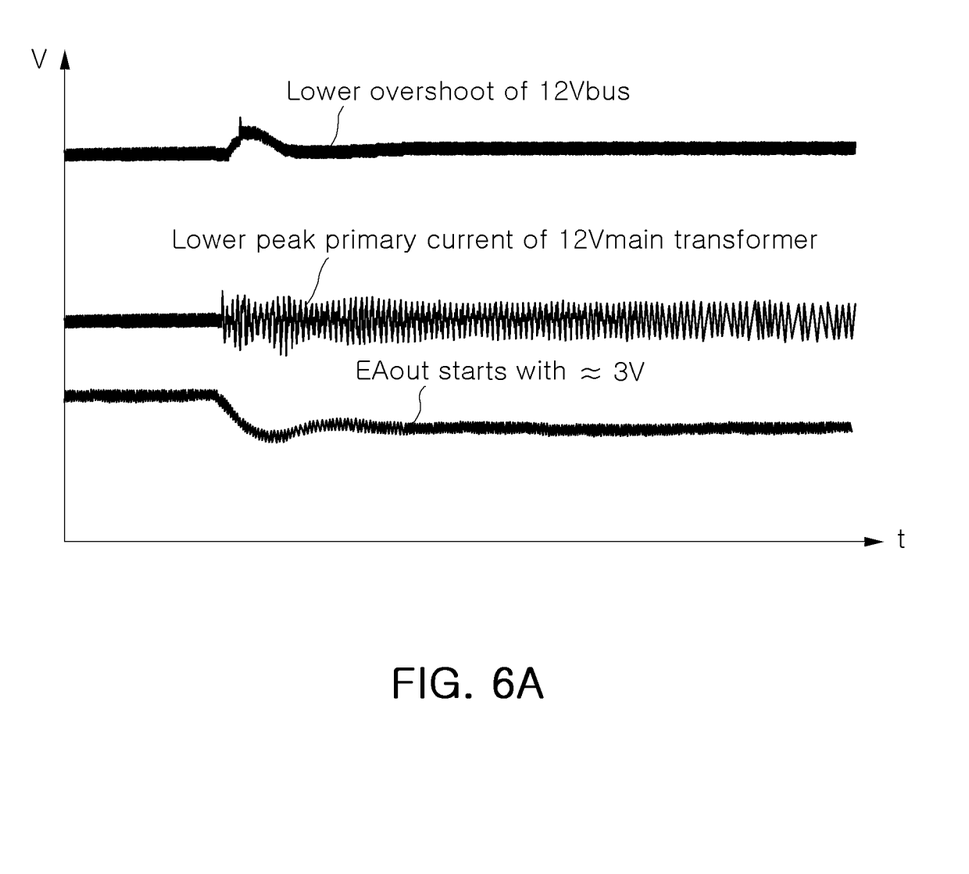
FIGS. 6A and 6B are graphs showing electrical characteristics of the power module illustrated in FIG. 3.
Figure 6B:
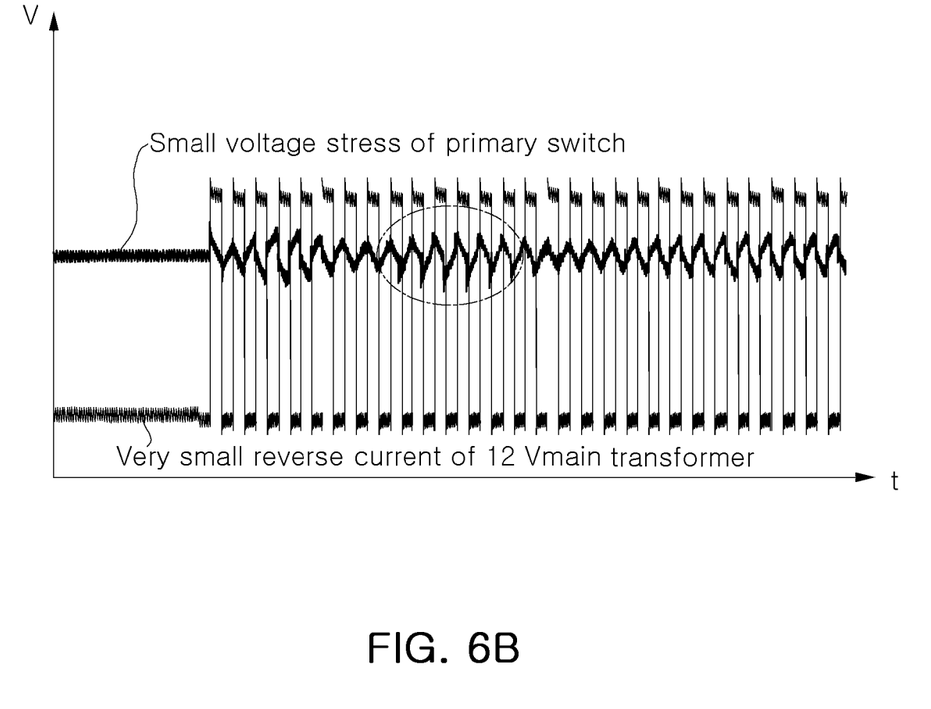

FIGS. 6A and 6B are graphs showing electrical characteristics of the power module illustrated in FIG. 3.

Referring to FIG. 6A, it can be seen that, in the cold standby mode, an output voltage of the comparator OP has a waveform starting from a low voltage according to a voltage level of bias power, and the output voltage of the comparator OP is lowered, and thus, a settling time is reduced to reduce overshooting of an output bus voltage, and accordingly, a peak value of a primary side current of the transformer is reduced.

Thus, referring to FIG. 6B, it can be seen that a current level reversely input to the primary side through the transformer is reduced, and voltage stress of a power switching element of the primary side is also reduced.

As described above, according to an embodiment of the present invention, when a standby mode is switched to a normal mode, a bias voltage is varied and supplied to the control circuit controlling power conversion, to thus restrain a generation of an inrush current when the mode is switched from the idle mode to the normal mode. Thus, an application of excessive voltage stress to the element used for power conversion can be prevented.

As set forth above, according to embodiments of the invention, by varying and supplying a bias voltage to the control circuit controlling power conversion in a standby mode and a normal mode, an inrush current is restrained from being generated when a mode is switched from the idle mode to the normal mode, and thus, an application of excessive voltage stress to the element used for power conversion can be prevented.

While the present invention has been shown and described in connection with the embodiments, it will be apparent to those skilled in the art that modifications and variations can be made without departing from the spirit and scope of the invention as defined by the appended claims.

What is claimed is:

1. A power module comprising:
   a power factor correction stage switching input power to correct a power factor thereof;
   a DC/DC conversion stage switching power having a corrected power factor from the power factor correction stage to convert the power into pre-set DC power in a powering mode in which normal power is output;
   a standby stage converting the power having a corrected power factor from the power factor correction stage into pre-set standby power in a cold standby mode in which the DC/DC conversion stage outputs power having a level lower than that of normal power; and
   a variable bias supply unit, provided with the converted pre-set standby power in a cold standby mode, varying a voltage level of bias power for controlling DC/DC power conversion and supplying the same to the DC/DC conversion stage in the cold standby mode and the powering mode, wherein the DC/DC conversion stage comprises:
- a DC/DC conversion unit switching power having a corrected power factor to convert it into DC power; and
- a DC conversion controller controlling a switching operation of the DC/DC conversion unit upon receiving bias power having a varied voltage level from the variable bias supply unit.

2. The power module of claim 1, wherein the power factor correction stage comprises:
- a power factor correction unit switching input power and regulating a phase difference between a voltage and a current of the input power to correct a power factor thereof; and
- a power factor correction controller controlling a switching operation of the power factor correction unit.

3. The power module of claim 1, wherein when the cold standby mode is switched to the powering mode, the DC/DC conversion unit performs a power switching operation by following a pre-set reference voltage.

4. The power module of claim 3, wherein the DC conversion controller comprises:
- a comparator comparing the reference voltage and a voltage detected from the output power upon receiving the bias power; and
- a signal generation unit generating a switching control signal for controlling power switching of the DC/DC conversion unit according to the comparison result from the comparator and a pre-set triangular wave signal.

5. The power module of claim 4, wherein the DC conversion controller further comprises a buffer buffering the comparison result from the comparator and delivering the same to the signal generation unit.

6. The power module of claim 4, wherein in the cold standby mode, the variable bias supply unit supplies pre-set first bias power to the comparator during a pre-set period of time, and in the powering mode, the variable bias supply unit supplies second bias power set to have a voltage level higher than that of the first bias power to the comparator during the pre-set period of time.

7. The power module of claim 6, wherein the variable bias supply unit comprises:
- a regulator converting standby power from the standby stage into first and second bias power according to a pre-set resistance ratio;
- a divided resistor group having a plurality of divided resistors for setting the resistance ratio; and
- a switch changing the set resistance ratio of the divided resistor group in the powering mode.

8. The power module of claim 1, further comprising:
an input filter unit rectifying AC power and filtering electromagnetic interference and providing the same to the power factor correction stage.

9. A distributed power supply apparatus comprising:
a plurality of power modules connected in parallel and supplying pre-set power, wherein each of the plurality of power modules comprises:
- a power factor correction stage switching input power to correct a power factor thereof;
- a DC/DC conversion stage switching power having a corrected power factor from the power factor correction stage to convert the power into pre-set DC power in a powering mode in which normal power is output;
- a standby stage converting the power having a corrected power factor from the power factor correction stage into pre-set standby power in a cold standby mode in which the DC/DC conversion stage outputs power having a level lower than that of normal power; and
- a variable bias supply unit provided with the converted pre-set standby power in a cold standby mode, varying a voltage level of bias power for controlling DC/DC power conversion and supplying the same to the DC/DC conversion stage in the cold standby mode and the powering mode, and wherein the DC/DC conversion stage comprises:
- a DC/DC conversion unit switching power having a corrected power factor to convert it into DC power; and
- a DC conversion controller controlling a switching operation of the DC/DC conversion unit upon receiving bias power having a varied voltage level from the variable bias supply unit.

10. The distributed power supply apparatus of claim 9, wherein the power factor correction stage comprises:
- a power factor correction unit switching input power and regulating a phase difference between a voltage and a current of the input power to correct a power factor thereof; and
- a power factor correction controller controlling a switching operation of the power factor correction unit.

11. The distributed power supply apparatus of claim 9, wherein when the cold standby mode is switched to the powering mode, the DC/DC conversion unit performs a power switching operation by following a pre-set reference voltage.

12. The distributed power supply apparatus of claim 9, wherein the DC conversion controller comprises:
- a comparator comparing the reference voltage and a voltage detected from the output power upon receiving the bias power; and
- a signal generation unit generating a switching control signal for controlling power switching of the DC/DC conversion unit according to the comparison result from the comparator and a pre-set triangular wave signal.

13. The distributed power supply apparatus of claim 12, wherein the DC conversion controller further comprises a buffer buffering the comparison result from the comparator and delivering the same to the signal generation unit.

14. The distributed power supply apparatus of claim 9, wherein in the cold standby mode, the variable bias supply unit supplies pre-set first bias power to the comparator during a pre-set period of time, and in the powering mode, the variable bias supply unit supplies second bias power set to have a voltage level higher than that of the first bias power to the comparator during the pre-set period of time.

15. The distributed power supply apparatus of claim 14, wherein the variable bias supply unit comprises:
- a regulator converting standby power from the standby stage into first and second bias power according to a pre-set resistance ratio;
- a divided resistor group having a plurality of divided resistors for setting the resistance ratio; and
- a switch changing the set resistance ratio of the divided resistor group in the powering mode.

16. The distributed power supply apparatus of claim 9, wherein each of the plurality of power modules further comprises an input filter unit rectifying AC power and filtering electromagnetic interference and providing the same to the power factor correction stage.

17. A power module comprising:

a power factor correction stage switching input power to correct a power factor thereof;

a DC/DC conversion stage switching power having a corrected power factor from the power factor correction stage to convert the power into pre-set DC power in a powering mode in which normal power is output;

a standby stage converting the power having a corrected power factor from the power factor correction stage into pre-set standby power in a cold standby mode in which the DC/DC conversion stage outputs power having a level lower than that of normal power; and a variable bias supply unit varying a voltage level of bias power for controlling DC/DC power conversion and supplying the same to the DC/DC conversion stage in the cold standby mode and the powering mode;

wherein the DC/DC conversion stage comprises:

- a DC/DC conversion unit switching power having a corrected power factor to convert it into DC power; and
- a DC conversion controller controlling a switching operation of the DC/DC conversion unit upon receiving bias power having a varied voltage level from the variable bias supply unit.

18. A distributed power supply apparatus comprising:

a plurality of power modules connected in parallel and supplying pre-set power, wherein each of the plurality of power modules comprises:

a power factor correction stage switching input power to correct a power factor thereof;

a DC/DC conversion stage switching power having a corrected power factor from the power factor correction stage to convert the power into pre-set DC power in a powering mode in which normal power is output;

a standby stage converting the power having a corrected power factor from the power factor correction stage into pre-set standby power in a cold standby mode in which the DC/DC conversion stage outputs power having a level lower than that of normal power; and a variable bias supply unit varying a voltage level of bias power for controlling DC/DC power conversion and supplying the same to the DC/DC conversion stage in the cold standby mode and the powering mode;

wherein the DC/DC conversion stage comprises:

- a DC/DC conversion unit switching power having a corrected power factor to convert it into DC power; and
- a DC conversion controller controlling a switching operation of the DC/DC conversion unit upon receiving bias power having a varied voltage level from the variable bias supply unit.

\* \* \* \* \*